United States Patent
Aday, Jr.

[11] 3,822,947
[45] July 9, 1974

[54] FLUID SAMPLE FLOW CELL

[76] Inventor: Roy W. Aday, Jr., 331 Holgate St., La Habra, Calif. 90631

[22] Filed: Feb. 28, 1973

[21] Appl. No.: 336,401

[52] U.S. Cl. ............................... 356/246, 356/181
[51] Int. Cl. ........................................... G01n 1/10
[58] Field of Search ............ 356/246, 181; 250/218

[56] References Cited
UNITED STATES PATENTS
3,020,795    2/1962    McKinney et al. ................. 356/246
3,289,527    12/1966   Gilford et al. ...................... 356/246

*Primary Examiner*—Vincent P. McGraw
*Attorney, Agent, or Firm*—R. J. Steinmeyer; J. G. Mesaros

[57] ABSTRACT

A fluid sample flow cell having a body member with a cylindrical opening therethrough, the cylindrical opening being sealed at opposite ends with transparent windows. An insert having an axially extending aperture therethrough is snugly fitted within the cylindrical opening, the end surfaces being displaced from the transparent windows to define an entrance chamber and an exit chamber respectively. The entrance chamber is provided with an inlet port within the body member, the inlet port being disposed parallel to and displaced from the diameter of the cylindrical opening. The exit chamber is provided with an exit port within the body member, the exit port being displaced from and parallel to the diameter of the cylindrical opening. The insert is provided with an annular portion extending into the exit chamber, the exit port communicating with the exit chamber in proximity to the outer surface of the annular portion.

9 Claims, 4 Drawing Figures

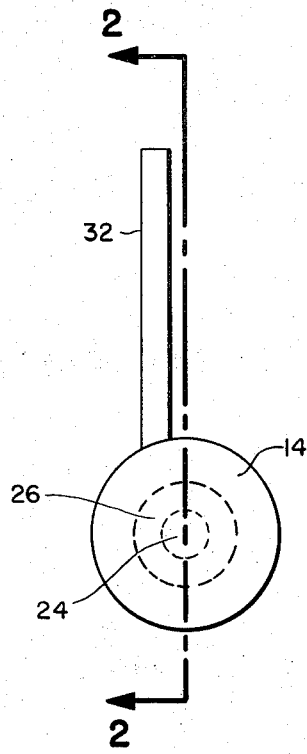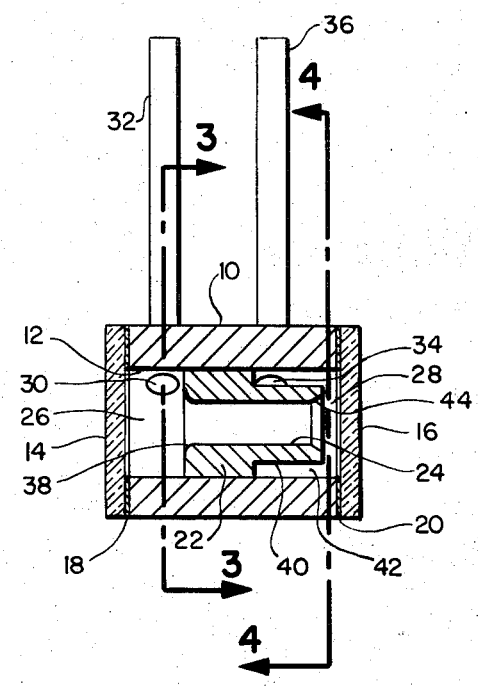
FIG. 1   FIG. 2
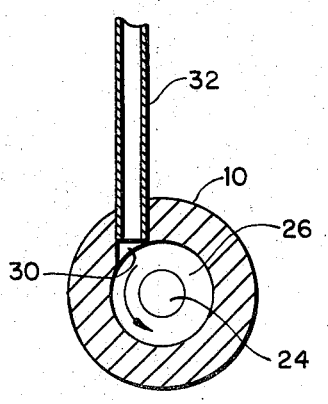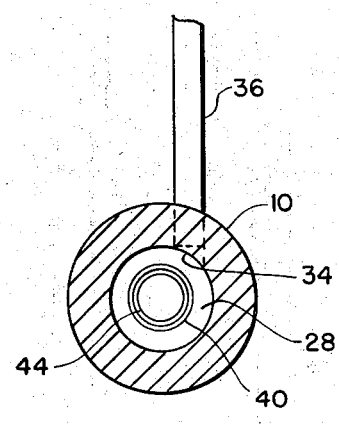
FIG. 3   FIG. 4

FLUID SAMPLE FLOW CELL

BRIEF BACKGROUND OF THE INVENTION

This invention relates to flow cells for receiving successive fluid samples to be examined by radiant energy measuring devices and particularly relates to a novel flow cell unit for use with a microsample spectrometer or similar measuring device.

In continuous measurement of characteristics of a fluid flowing through a fluid sample flow cell, certain problems are encountered such as inter-sample contamination and the formation of bubbles which lie in the optical path, both of which distort the analytical results. Fluid sample flow cells of current design have become very complicated in construction in order to obviate the problems. Such structures have included for example, inserts within the flow cell having the end sections tapered transverse to the axis of the insert such as shown in U.S. Pat. No. 3,289,527, and other flow cells having inserts with channels and cross-channels and elongated openings such as shown in U.S. Pat. No. 3,515,491. The structure shown in the foregoing patents require extensive precision machining and comprise elaborate structures with complex fluid sample flow through the cell.

SUMMARY OF THE INVENTION

Accordingly, it is an object of the invention to provide a new and improved fluid sample flow cell.

It is another object of this invention to provide a fluid sample flow cell having a relatively uncomplicated construction.

It is a further object of this invention to provide a fluid sample flow cell which directs the flow of fluid through the cell to minimize bubbles and inter-sample contamination.

The above and other advantages of the invention are accomplished by providing a flow cell having a cylindrical body member with a cylindrical aperture extending therethrough, the aperture being sealed at opposite ends with transparent windows. An insert is fitted within the aperture to define first and second chambers at opposite ends of the aperture adjacent the transparent windows. The insert is configured to provide a cylindrical fluid sample receiving and analyzing passageway therethrough, the passageway being of smaller diameter than the aperture, with one end of the insert being provided with an annular portion having the outer surface thereof displaced from the inner surface of the aperture of the body member. An entrance port communicates with one of the chambers while an exit port communicates with the other chamber containing the annular portion of the insert. The entrance and exit ports are disposed generally parallel to each other, and are directed through the body member along a line parallel to but displaced from the diameter of the aperture of the body member. The entrance end of the passageway of the insert is rounded to minimize turbulence by fluid flow, while the exit end thereof, which is displaced from the adjacent transparent window, has the edge thereof chamfered to increase the velocity of fluid to break up air bubbles in the space between the chamfered edge and the window. Additionally the chamfered entrance end and exit end of the passageway cause increased fluid velocity in the passageway, thereby eliminating retention of bubbles due to capillary action at the passage walls.

BRIEF DESCRIPTION OF THE DRAWINGS

Other objects and advantages of the invention will become more apparent from the following description of a preferred embodiment taken in conjunction with the accompanying drawings in which:

FIG. 1 is an elevational view of one end of the flow cell according to the invention;

FIG. 2 is a sectional side view of the flow cell taken along line 2—2 of FIG. 1;

FIG. 3 is a sectional end view of the flow cell taken along line 3—3 of FIG. 2; and FIG. 4 is a sectional end view of the flow cell taken along line 4—4 of FIG. 2.

DESCRIPTION OF THE PREFERRED EMBODIMENT

Referring now to the drawings and particularly to FIGS. 1 and 2 there is shown a flow cell in accordance with the invention, the flow cell having a body member 10 having a cylindrical opening 12 extending therethrough. The opening 12 is suitably sealed at opposite ends with transparent windows 14 and 16 having interposed therebetween gasket members 18 and 20 respectively.

Fitted within the opening 12 is an insert member 22 having the outer diameter thereof abutting the inner surface of opening 12. The insert 22 is provided with an axially disposed aperture 24 to provide the fluid sample receiving and analyzing passageway.

The insert 24 has a length shorter than the length of cylindrical body member 10 to thereby form a first chamber 26 and a second chamber 28 between the end surfaces of insert 22 and respective adjacent transparent windows. Communicating with the first chamber 26 is an entrance port 30 (see also FIG. 3) for passage therethrough of the fluid sample through entrance tube 32. Exit chamber 28 is likewise provided with an exit port 34 for passage therethrough of sample fluid from chamber 28 into exit tube 36.

Entrance chamber 26 has an essentially cylindrical configuration with the entrance end of passageway 24 having the edge 38 thereof rounded to minimize the resistance of fluid sample flow from chamber 26 into passageway 24.

Within chamber 28 insert 22 is provided with an annular portion 40 with the inner surface thereof being coextensive with the inner surface of passageway 24 while the outer surface thereof is of a diameter smaller than the diameter of opening 12 to provide an annular passageway 42 about the periphery of the outer surface of annular portion 40. Exit port 10 is so disposed to communicate with chamber 28 within the annular passageway 42. The edge of annular portion 40 terminates short of transparent window 16 to provide a space therebetween, with the edge thereof being chamfered to provide an increasing diameter of the annular portion in the direction of fluid flow (see also FIG. 4).

In the operation of a flow cell of this type a fluid sample is inserted into the cell, analytical measurements are taken after the fluid has settled, and the flow cell is then subsequently cleaned by means of a solvent or air wash prior to the insertion of the next sample to be analyzed. As shown in FIGS. 1, 2, 3 and 4 the inlet tube 32 and entrance port 30 communicating therewith are disposed parallel to and offset from the diameter of the body member 10. Exit portion 34 along with exit tube 36 communicating therewith are likewise disposed offset from the diameter of body member 10. Furthermore the inlet tube 32 and exit tube 36 are parallel to each other and disposed in the same direction. During insertion of fluid sample into the flow cell, referring to FIG. 3, the offsetting of inlet tube 32 creates a swirling action in a counterclockwise direction (as indicated by the arrow) as the fluid sample enters chamber 26. The swirling action tends to minimize the creation of air bubbles as does the rounded corner 38 of entrance end of passageway 24 (see FIG. 2). The fluid flows through passageway 24 whereupon as it exits from the enlarged diameter created by chamfered edge 44 the velocity of the fluid sample increases tending to drive air bubbles into the space between the edge of annular portion 40 and the adjacent transparent window 16. The spacing between the edge of annular portion 40 and transparent window 16 tends to break up any air bubbles larger than the spacing distance, with any air bubbles remaining tending to accumulate within the annular passageway 42, thereby resulting in a relatively bubble-free path along passageway 24 through which the radiant energy is passed for fluid sample analysis. The fluid sample is permitted to attain a quiescent state prior to the analysis, and during this time period any air bubbles forming would gather adjacent the upper surfaces of enlarged chambers 26 and 28 to permit relatively unobstructed analysis.

Subsequently when the flow cell is then cleansed of the fluid sample by a solvent or air wash as the solvent or air is directed in through the entrance tube 32 the swirling action tends to cleanse the lower portions of entrance chamber 26 directing the wash medium through the passageway 24 into the enlarged chamber 28, whereupon a swirling effect is created to withdraw the cleansing medium through exit tube 36 to prepare the flow cell for receipt of the next fluid sample.

Consequently it can be seen that the configuration of the body member 10 and the insert 40 create a fluid flow which minimizes bubbles and inter-sample contamination. While there has been shown and described a preferred embodiment, it is to be understood that various other adaptations and modifications may be made within the spirit and scope of the invention.

I claim:

1. A fluid sample flow cell comprising:
   a body having a cylindrical fluid sample receiving and analyzing passageway therethrough;
   said body having adjacent each end of said passageway a chamber of greater diameter than said passageway;
   said body having sealing means, including transparent windows disposed over the ends of said chambers;
   an entrance port communicating with one of said chambers, said one chamber having a wall substantially parallel to the transparent window associated therewith;
   an exit port communicating with the other of said chambers; and
   an annular portion formed with said body and displaced from said transparent window within said other chamber, said annular portion having an inner surface coextensive with said passageway and having an outer surface having a diameter less than the diameter of said other chamber, the end of said annular portion adjacent said transparent window being substantially parallel thereto.

2. The combination according to claim 1 wherein each of said chambers has a circular cross section, and said other chamber has an annular passageway formed therein about the periphery of said annular portion.

3. The combination according to claim 2 wherein said entrance port is disposed parallel and offset from the diameter of said one of said chambers.

4. The combination according to claim 3 wherein said exit port communicates only with said annular passageway in said other chamber.

5. The combination according to claim 4 wherein said exit port is disposed parallel to and offset from the diameter of said other chamber.

6. The combination according to claim 5 wherein said body includes a cylindrical member having a cylindrical aperture therethrough and an insert secured within said aperture, said analyzing passageway extending through said insert, and said chambers being defined by the ends of said insert, the inner surface of said cylindrical aperture, and said sealing means.

7. The combination according to claim 6 wherein said analyzing passageway has the entrance end thereof configured to provide a reducing diameter in the direction of fluid flow.

8. The combination according to claim 7 wherein the exit end of said analyzing passageway is configured to provide an increasing diameter in the direction of fluid flow.

9. The combination according to claim 8 wherein the entrance end and the exit end of said analyzing passageway are chamfered.

* * * * *